(12) United States Patent
Tang

(10) Patent No.: US 8,212,955 B2
(45) Date of Patent: Jul. 3, 2012

(54) BACKLIGHT MODULE WITH BEZEL HAVING PROTRUSIONS THEREON AND LIQUID CRYSTAL DISPLAY USING SAME

(75) Inventor: Chih-Shun Tang, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 395 days.

(21) Appl. No.: 12/221,996

(22) Filed: Aug. 8, 2008

(65) Prior Publication Data

US 2009/0040430 A1 Feb. 12, 2009

(30) Foreign Application Priority Data

Aug. 8, 2007 (CN) .......................... 2007 1 0075643

(51) Int. Cl.
*G02F 1/1333* (2006.01)
*G02F 1/1335* (2006.01)
(52) U.S. Cl. ................. 349/58; 349/56; 349/61
(58) Field of Classification Search .................... 349/56, 349/58, 61, 65
See application file for complete search history.

(56) References Cited

U.S. PATENT DOCUMENTS

| | | | |
|---|---|---|---|
| 6,976,781 B2 | 12/2005 | Chu et al. | |
| 7,033,064 B2* | 4/2006 | Ida | 362/634 |
| 2002/0113918 A1* | 8/2002 | Hiratsuka et al. | 349/65 |
| 2003/0179580 A1 | 9/2003 | Ito et al. | |
| 2004/0141309 A1* | 7/2004 | Ida | 362/31 |
| 2004/0160547 A1* | 8/2004 | Watanabe | 349/58 |
| 2004/0196413 A1* | 10/2004 | Satonaka | 349/58 |
| 2007/0002598 A1* | 1/2007 | Paull | 363/132 |
| 2007/0139958 A1 | 6/2007 | Wu et al. | |

* cited by examiner

*Primary Examiner* — Brian M. Healy
*Assistant Examiner* — Mary A El-Shammaa
(74) *Attorney, Agent, or Firm* — WPAT., P.C.; Justin King

(57) ABSTRACT

An exemplary backlight module includes at least one light source, a light guiding plate having a light incident portion adjacent to the at least one light source, a bezel having a plurality of protrusion; and a reflector disposed between the light guiding plate and the protrusions of the bezel. The protrusions abut edges of the reflector, and provide supporting force to attach the reflector to the bezel. A related liquid crystal display is also provided.

19 Claims, 4 Drawing Sheets

BACKLIGHT MODULE WITH BEZEL HAVING PROTRUSIONS THEREON AND LIQUID CRYSTAL DISPLAY USING SAME

FIELD OF THE INVENTION

The present invention relates to a backlight module with a bezel having protrusions thereon.

GENERAL BACKGROUND

A typical liquid crystal display (LCD) includes a passive optical liquid crystal panel and a backlight module to provide sufficient illumination for the liquid crystal panel, so that the LCD can display images.

FIG. 7 is an exploded, isometric view of a typical LCD. The typical LCD 100 includes a liquid crystal panel 19 and a backlight module 10. The backlight module 10 includes a light shield member 110, a plurality of light emitting diodes (LEDs) 120, an optical film set 130, a light guiding plate (LGP) 140, a frame 150, a reflector 160, and a bezel 180.

The LGP 140 includes a bottom surface 142 and a light incident surface 143 adjoining the bottom surface 142. The frame 150 includes four sidewalls 151 that cooperatively define an accommodating space (not labeled), and a plurality of grooves (not labeled) formed at one of the sidewalls 151. A rectangular adhesive tape 162 is affixed along the edges of the reflector 160.

In assembly, the LGP 140, the optical film set 130, and the light shield member 110 are received in the accommodating space. Each LED 120 is received in a corresponding groove and adjacent to the light incident surface 143. The reflector 160 is received in the bezel 180. The frame 150, the LGP 140, the optical film set 130, the light shield member 110, and the plurality of LEDs 120, are positioned onto the reflector 160. The bottom surface 142 is attached to the reflector 160 via the adhesive tape 162. The liquid crystal panel 19 is positioned onto the backlight module 10 forming the LCD 100.

In operation, incident light beams are emitted from the LEDs 120 to the LGP 140. A part of the light beams are emitted out from the bottom surface 142 and reflected back into the LGP 140 by the reflector 160. The LGP 140 guides both the incident and reflected light beams to the liquid crystal panel 19.

A typical thickness of the adhesive tape 162 is usually in a range from about 0.03 to about 0.05 millimeters, to ensure adhesion between the LGP 140 and the reflector 160. However, the typical thickness may induce a gap between the LGP 140 and the reflector 160. Light beams emanating from the bottom surface 142 of the LGP 140 may be consumed in the gap. As a result, the light utilization efficiency of the backlight module 10 is low and the brightness of the LCD 100 is degraded.

Therefore, a backlight module and an LCD employing such backlight module is desired to overcome the above-described deficiencies.

SUMMARY

In one aspect, a backlight module includes at least one light source, a light guiding plate having a light incident portion adjacent to the at least one light source, a bezel having a plurality of protrusion; and a reflector disposed between the light guiding plate and the protrusions of the bezel. The protrusions abut edges of the reflector, and provide supporting force to attach the reflector to the bezel.

Other novel features and advantages will become more apparent from the following detailed description when taken in conjunction with the accompanying drawings.

DETAILED DESCRIPTION OF THE EMBODIMENTS

Reference will now be made to the drawings to describe preferred and exemplary embodiments of the present invention in detail.

Figure 1:
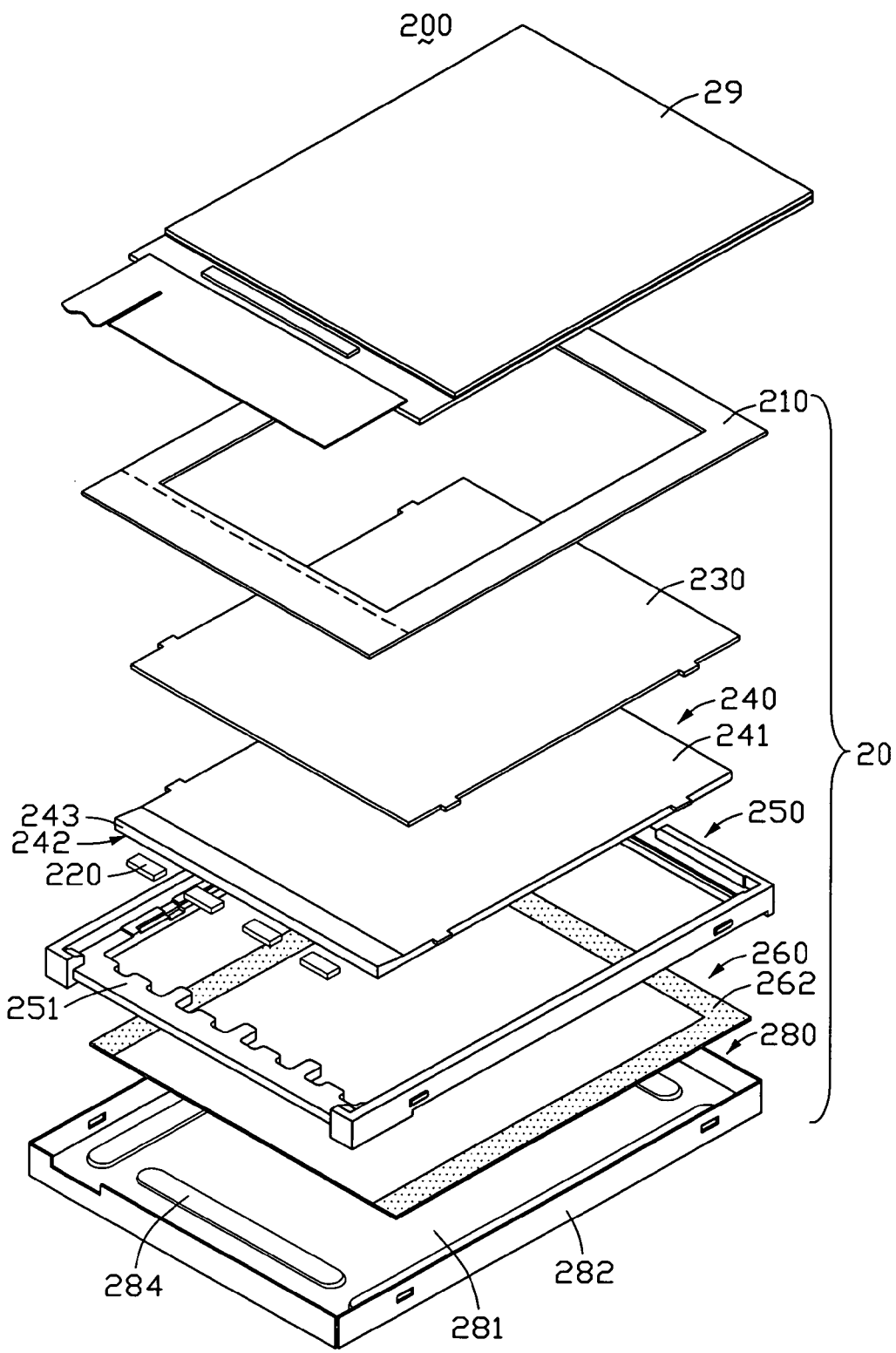
FIG. 1 is an exploded, isometric view of an embodiment of an LCD, the liquid crystal display including a backlight module including a bezel.
Figure 2:
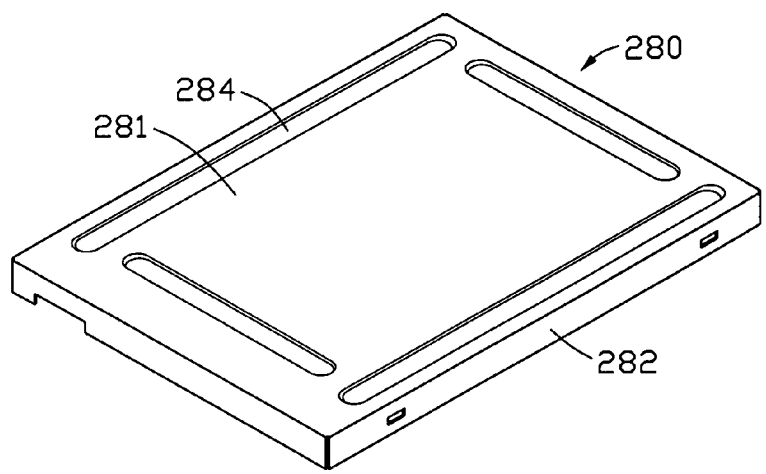
FIG. 2 is an isometric view of the bezel of the backlight module of FIG. 1 but from a different aspect.

FIG. 1 is an exploded, isometric view of a first embodiment of an LCD 200. The LCD 200 includes a liquid crystal panel 29 and a backlight module 20 for illuminating the liquid crystal panel 29. The backlight module 20 includes a light shield member 210, a plurality of light sources 220, an optical film set 230, an LGP 240, a frame 250, a reflector 260, and a bezel 280.

The LGP 240 includes a main light guide portion 241 and a light incident portion (not labeled) having a light incident surface 243. In the embodiment of FIG. 1, the light incident portion is a wedge-shaped structure that gradually tapers with increasing distance away from the light incident surface 243. The frame 250 includes four sidewalls 251 connected end to end and cooperatively defining a main accommodating space (not labeled). One of the sidewalls 251 corresponds to the light incident portion of the LGP 240, and includes a plurality of grooves (not labeled) for receiving the light sources 220. The light sources 220 may be LEDs. In the embodiment of FIG. 1, a U-shaped adhesive tape 262 is affixed along an outer periphery of the reflector 260 except for a portion of the reflector 260 corresponding to the light incident portion of the LGP 240. In one embodiment, a thickness of the adhesive tape 262 is approximately 0.01 millimeters.

The bezel 280 includes a rectangular bottom plate 281 and four sidewalls 282. Each sidewall 282 extends from an edge of the bottom plate 281 and connected end to end. A plurality of protrusions 284 extend from an inner surface of the bottom plate 281. In the embodiment of FIG. 1, the protrusions 284 are positioned adjacent to the sidewalls 282. The protrusions 284 may be formed by stamping the bottom plate 281. In one embodiment, a height of the protrusion 284 is in a range from about 0.02 to about 0.04 millimeters.

Figure 3:
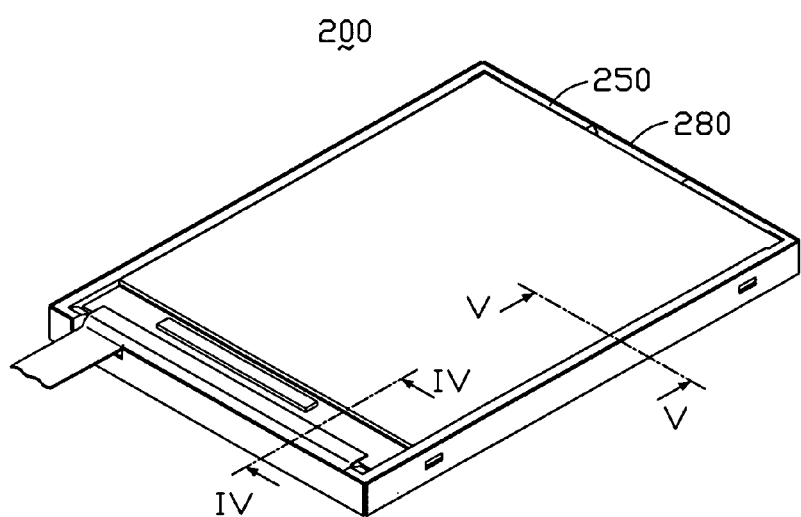
FIG. 3 is an assembled view of the LCD of FIG. 1.
Figure 4:
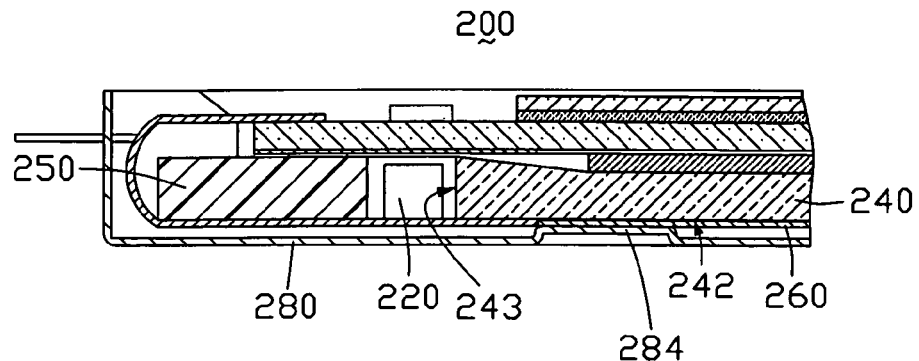
FIG. 4 is a cross sectional view of the LCD of FIG. 3, taken along line IV-IV.
Figure 5:
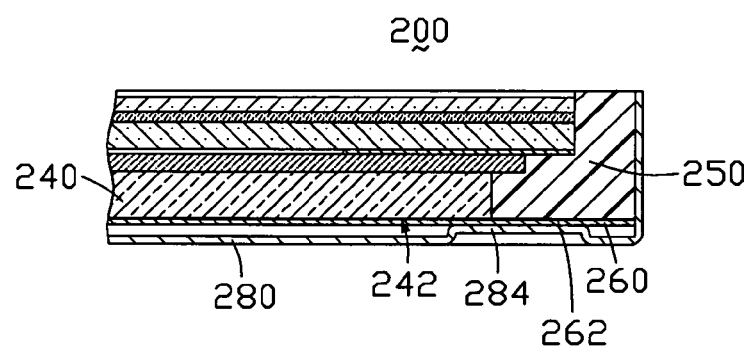
FIG. 5 is a cross sectional view of the LCD of FIG. 3, taken along line V-V.

Referring to FIGS. 3-5, the LGP 240, the optical film set 230, and the light shield member 210 are received in the accommodating space. Each of the light sources 220 is received in a groove of the frame 250 adjacent to the light incident surface 243. The reflector 260 is then affixed to the bottom surface 242 via the adhesive tape 260. The frame 250, the LGP 240, the optical film set 230, the light shield member 210, the LEDs 220, and the reflector 260 are received in the bezel 280. The protrusions 284 abut the reflector 260. The liquid crystal panel 29 is positioned onto the backlight module 20 and secured to the bezel 280 by a front frame (not shown).

The protrusions 284 provide a supporting force to ensure adhesion between the LGP 240 and the reflector 260. Thus, a thickness of the adhesive tape 262 may be reduced, and a gap between the light guide portion 241 and the reflector 260 is minimized. As a result, light paths of light beams emanating from the bottom surface 242 are reduced thereby improving the light utilization efficiency of the backlight module 20 and the brightness of the LCD 200. In addition, the U-shaped adhesive tape 262 prevents light beams from being absorbed by the adhesive tape 262 in a region corresponding to the light incident portion, further improving the light utilization efficiency of the backlight module 20.

Figure 6:
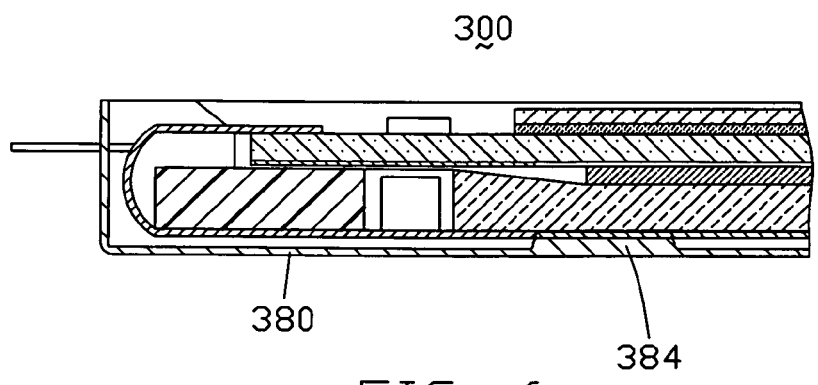
FIG. 6 is cross sectional view of a second embodiment of an LCD.
Figure 7:
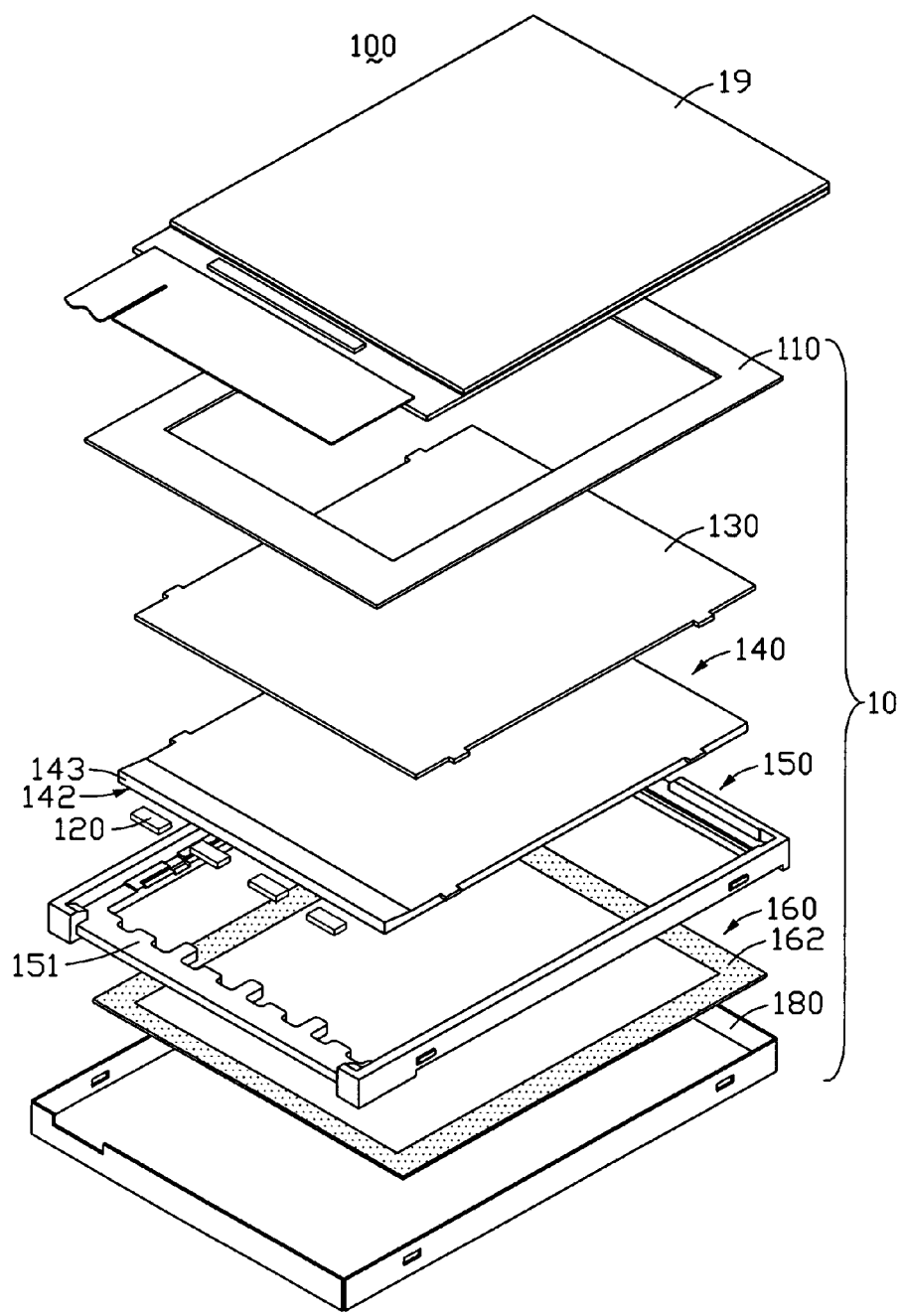
FIG. 7 is an exploded, isometric view of a typical LCD.

FIG. 6 is a cross sectional view of an LCD 300 according to a second embodiment of the present invention. The LCD 300 is similar to the LCD 200 of FIG. 1, except that the LCD 300 includes a backlight module (not labeled) having a plurality of solid protrusions 384. The protrusions 384 extend from a bottom plate (not labeled) of a bezel 380. In another embodiment, the protrusions 384 may be removable elements mounted on the bottom plate. For example, the elements may be elastic members that provide an elastic force to the reflector 360.

It is to be understood, however, that even though numerous characteristics and advantages of preferred and exemplary embodiments have been set out in the foregoing description, together with details of the structures and functions of the embodiments, the disclosure is illustrative only, and changes may be made in detail within the principles of the embodiments to the full extent indicated by the broad general meaning of the terms in which the appended claims are expressed.

What is claimed is:

1. A backlight module, comprising:
    at least one light source;
    a light guiding plate comprising a light incident portion, the light incident portion being adjacent to the at least one light source;
    a bezel comprising a plurality of elastic protrusions extending from a bottom plate of the bezel;
    a reflector disposed between the light guiding plate and the elastic protrusions of the bezel; and an adhesive member disposed between the reflector and the light guiding plate and adhering the reflector onto the light guiding plate;
    wherein the elastic protrusions abut the reflector to provide an elastic supporting force to the reflector and ensure adhesion between the light guiding plate and the reflector.

2. The backlight module of claim 1, wherein the adhesive member is a tape.

3. The backlight module of claim 1, wherein the adhesive member is U-shaped, and affixed to an outer periphery of the reflector except for a portion corresponding to the light incident portion.

4. The backlight module of claim 1, wherein a thickness of the adhesive member is equal to 0.01 millimeters.

5. The backlight module of claim 1, wherein the protrusions are depressed toward the reflector.

6. The backlight module of claim 5, wherein a height of the protrusion is in a range from 0.02 to 0.04 millimeters.

7. The backlight module of claim 5, wherein the protrusions are solid.

8. The backlight module of claim 1, wherein the protrusions are removably mounted to the bezel.

9. The backlight module of claim 1, wherein the light incident portion is a wedge-shaped structure that gradually tapers with increasing distance away from the at least one light source.

10. A liquid crystal display, comprising:
    a liquid crystal panel; and
    a backlight module to illuminate the liquid crystal panel, the backlight module comprising:
        at least one light source;
        a light guiding plate comprising a light incident portion adjacent to the at least one light source;
        a reflector attaching to a bottom surface of the light guiding plate and disposed between the light guiding plate and the elastic protrusions of the bezel;
        an adhesive member disposed between the reflector and the light guiding plate and adhering the reflector onto the light guiding plate; and
        a receiving structure for receiving the reflector, the light guiding plate, and the at least one light source, wherein the receiving structure comprises a main plate and a plurality of elastic supporting elements positioned on the main plate, the elastic supporting elements abut the reflector to provide an elastic supporting force to the reflector and ensure adhesion between the light guiding plate and the reflector.

11. The liquid crystal display of claim 10, wherein the adhesive member is U-shaped and is affixed to an outer periphery of the reflector except for a portion corresponding to the light incident portion.

12. The liquid crystal display of claim 10, wherein the adhesive member is a tape.

13. The liquid crystal display of claim 11, wherein the supporting elements are protrusions extending from the main plate.

14. The liquid crystal display of claim 13, wherein the protrusions are depressed toward the reflector.

15. The backlight module of claim 13, wherein the protrusions are solid.

16. The liquid crystal display of claim 13, wherein the supporting elements are an elastic member capable of providing an elastic force.

17. The liquid crystal display of claim 10, wherein the supporting elements are removably mounted to the main plate.

18. The liquid crystal display of claim 10, wherein the light incident portion is a wedge-shaped structure that gradually tapers with increasing distance away from the at least one light source.

19. A backlight module, comprising:
    at least one light source;
    a light guiding plate comprising a light incident surface adjacent to the at least one light source;
    a receiving structure comprising a plurality of elastic protrusions extending from a bottom plate of the receiving structure; and
    an adhesive member disposed between a reflector and the light guiding plate and adhering the reflector onto the light guiding plate;
    wherein the reflector is disposed between the light guiding plate and the elastic protrusions of the receiving structure, the elastic protrusions abut the reflector to provide an elastic supporting force to the reflector and ensure adhesion between the light guiding plate and the reflector.

* * * * *